United States Patent [19]

Korchynsky et al.

[11] E Re. 28,791

[45] Reissued Apr. 27, 1976

[54] HIGH-STRENGTH PLAIN CARBON STEELS HAVING IMPROVED FORMABILITY

[75] Inventors: Michael Korchynsky; John David Grozier; John L. Mihelich, all of Bethel Park, Pa.

[73] Assignee: Jones & Laughlin Steel Corporation, Pittsburgh, Pa.

[22] Filed: Nov. 11, 1974

[21] Appl. No.: 522,526

Related U.S. Patent Documents

Reissue of:

[64] Patent No.: 3,671,336
Issued: June 20, 1972
Appl. No.: 842,338
Filed: July 16, 1969

[52] U.S. Cl. ..... 148/36; 75/123 B; 75/123 E; 75/123 H; 75/123 N; 75/123 L; 148/12 F; 148/12.3

[51] Int. Cl.[2] ..... C22C 38/02

[58] Field of Search ..... 148/36, 12 R, 12 F, 148/12.3, 12.1; 75/123 B, 123 E, 123 H, 123 N, 123 L, 124

[56] References Cited

UNITED STATES PATENTS

| | | | |
|---|---|---|---|
| 2,360,717 | 10/1944 | Phelps | 75/53 |
| 2,683,662 | 7/1954 | Tisdale et al. | 75/123 |
| 3,102,831 | 9/1963 | Tisdale | 148/12 |
| 3,333,987 | 8/1967 | Schrader et al. | 148/12.1 |

OTHER PUBLICATIONS

Lichy et al., Control of Sulfide Shape in Low Carbon Al-Killed Steel, Journal of Metals, July 1965, pp. 769–775.

*Primary Examiner*—R. Dean
*Attorney, Agent, or Firm*—Buell, Blenko, & Ziesenheim

[57] ABSTRACT

Fully killed high-strength plain carbon steels consisting essentially of 0.06% to .20% carbon, .4% to 1.2% manganese, .005% to .3% silicon, .04% maximum sulfur, .04% maximum phosphorus, an inclusion shape control agent comprising .05% to .20% zirconium, or .01% to .10% of rare earths or .01% to .10% mischmetal, balance iron are characterized in a hot-rolled finished condition by a yield strength in excess of 35,000 p.s.i., an ultimate tensile strength in excess of 55,000 p.s.i., ductility as measured by percent elongation (2 inches) in excess of 30%, good toughness and superior formability. The steels are hot-rolled finished in the temperature range 1550° F. to 1650° F., cooled at a rate within the temperature range 20° F. to 135° F. per second and collected by coiling or piling within a temperature range of 900° F. to 1200° F., preferably between 1025° F. to 1175° F.

6 Claims, No Drawings

HIGH-STRENGTH PLAIN CARBON STEELS HAVING IMPROVED FORMABILITY

Matter enclosed in heavy brackets [ ] appears in the original patent but forms no part of this reissue specification; matter printed in italics indicates the additions made by reissue.

This invention relates generally to high-strength steels and particularly to high-strength plain carbon steels of superior formability.

We have developed a class of high-strength plain carbon steels which in a hot-rolled finished condition exhibit good ductility and a toughness and strength previously available only in steels containing an alloy strengthening agent or steels heat treated after hot rolling. The improved properties are brought about by hot rolling the steels under critical temperature conditions. The steels of the invention also exhibit superior formability resulting from the use of an inclusion shape-control agent comprising either zirconium, or rare earths, or mischmetal which, of course, is a mixture of rare earths. The use of an inclusion shape-control agent results in the formation of substantially spherically shaped inclusion which retain their spherical shape in the hot-rolled finished material.

Accordingly, an object of the present invention is to provide plain carbon steels having high strength in combination with good toughness and ductility and superior formability. Another object of the invention is to provide such steels characterized in a hot-rolled finished condition by yield strengths in excess of 35,000 p.s.i., ultimate tensile strengths in excess of 55,000 p.s.i., ductilities as measured by percent elongation (2 inches) in excess of 30% and good toughness. Still another object of the invention is to provide such steels which can be bent without cracking about an inside radius which is equal to or less than about one-half the thickness of the steels.

These and other objects and advantages of the present invention will become apparent from the following detailed description thereof.

The steels of the present invention are fully killed and have the following general chemistry: carbon, .06% to .20%; manganese, .4% to 1.2%; slicon, .005% to .3%; sulfur, .04% maximum; phosphorus, .04% maximum; an inclusion shape-control agent comprising either .05% to .20% zirconium, or .01% to .10% of rare earths or .01% to .10% mischmetal; and balance iron.

The preferred steels of the invention consist essentially of .12% to .16% carbon, .5% to .7% manganese, .1% maximum silicon, .02% maximum sulfur, .03% maximum phosphorus, .08% to .12% zirconium or .01% to .10% of rare earths or mischmetal, balance iron. Rare earths which are employed in the steels of the invention are, for example, cerium, lanthanum, praseodymium, neodymium, yttrium and scandium.

Steels to possess the desired characteristics and properties of a yield strength in excess of 35,000 p.s.i., an ultimate tensile strength in excess of 55,000 p.s.i., ductility as measured by percent elongation (2 inches) in excess of 30% and good toughness are hot-rolled finished in the temperature range of 1550° F. to 1650° F., cooled at a rate within the range of 20° F. to 135° F. per second and collected by coiling or piling within a preferred temperature range of 1025° F. to 1175° F. Steels finished and/or collected at temperatures in excess of the temperatures set out above or cooled at a rate less than 20° F. per second generally exhibit strengths below a yield strength of 35,000 p.s.i. and an ultimate tensile strength of 55,000 p.s.i. In addition, the steels do not have as good impact properties as steels hot rolled within the temperature ranges set out above. Steels finished or coiled below the preferred temperature ranges exhibit ductilities as measured by percent elongation inferior to the ductilities of steels of the invention. In addition, low finishing temperatures result in production liabilities in that rolling speeds must be slower to achieve lower finishing temperatures.

As noted above, the inclusion shape-control agents cause the sulfide inclusions in the steels to retain a spherical form, resulting in a significant improvement in the formability of the material. In the absence of an inclusion shape-control agent, certain inclusions become elongated during hot rolling and aligned parallel to the rolling direction and adversely affect the formability of the steels.

Sufficient zirconium is added to the steels of the invention so that there is a minimum of .02% zirconium in the steel in excess of the zirconium which combines with the nitrogen in the steel to form nitrides. For a typical high-strength low alloy steel containing .006% nitrogen, therefore, approximately a minimum of .06% zirconium is added to the steel. The minimum amount of zirconium required is given by the following formula: Percent zirconium=0.02% zirconium+6.5 (wt. percent N). The zirconium is preferably added to the steel in the ingot mold during teeming. Zirconium additions are made when the mold is about one-third full and the additions completed by the time the mold is about two-thirds full. Typical zirconium recoveries achieved employing this method of addition are about 60%. The zirconium additions can also be made to the ladle after the heat is tapped. However, the steel in the ladle must be fully killed to assure good zirconium recovery. In this technique, it is important to employ good teeming practice to minimize oxygen or nitrogen entrainment during teeming which adversely affects zirconium recovery.

The significance of processing the steels within a finishing temperature range of 1550° F. to 1650° F., cooling the steel at a rate within the temperature range 20° F. to 135° F. per second and collecting the steel within a preferred temperature range of 1025° F. to 1175° F. is demonstrated in Table I.

TABLE I

| Product | Gage inch | Rolling temperatures (° F.) Finish | Rolling temperatures (° F.) Collected | Cooling rate, °F. per second[1] | Yield strength, p.s.i. | Ultimate tensile strength, p.s.i. | Percent elongation (8") | Grain size (ASTM No./) | Longitudinal impact trans. temp. (°F.) (50% FATT) |
|---|---|---|---|---|---|---|---|---|---|
| Coil | 0.250 | 1,630 | 1,050 | 40 | 40,900 | 64,700 | 28.0 | 9.6 | −50 |
| | 0.312 | 1,610 | 1,070 | 35 | 38,900 | 66,200 | 29.5 | 10.4 | −55 |
| Plate | 0.250 | 1,790 | 1,300 | 2 | 35,600 | 62,400 | 26.5 | 8.9 | −25 |
| | 0.312 | 1,760 | 1,350 | 2 | 32,700 | 60,000 | 31.0 | 7.6 | −15 |

[1]Cooling rate between the finishing and collecting temperature.

The heat from which the products of Table I were processed had an analysis of .14% C, .16% Mn and .06% Si. The lower finishing and coiling temperatures of the coiled products together with their more rapid cooling rates resulted in their smaller grain size and higher strength and improved notch toughness, as shown by their lower fracture appearance transition temperatures (FATT), as compared with the plate products.

The improved properties brought about by the increased cooling rates of the invention are shown in Table II.

TABLE II

| Heat No. | Gage, inch | (°F./seconds) | Yield strength, p.s.i. | Ultimate tensile strength, p.s.i. | Percent elongation (1") | Grain size (ASTM) | Longitudinal impact trans. temp. (°F.) (50% FATT) |
|---|---|---|---|---|---|---|---|
| 427829 | 0.50 | 2 | 30,300 | 51,600 | 36.5 | 6.6 | >+70 |
| | 0.50 | 66 | 47,700 | 63,700 | 36.5 | 8.8 | −20 |
| COM-2 | 0.50 | 2 | 33,300 | 55,000 | 37.5 | 7.0 | +70 |
| | 0.50 | 73 | 47,600 | 65,900 | 37.5 | 9.4 | −10 |

Heat No. 427829 was a plain carbon steel containing .14% carbon, .28% manganese and .06% silicon. Heat No. COM-2 was a plain carbon steel containing .12% carbon, .44% manganese and .05% silicon. The faster cooling rates resulted in reduced ferrite grain sizes which bring about the higher yield strengths and improved toughness.

The improved formability of the steels of the invention is shown in Table III.

TABLE III

| Heat No. | Gage, inch | Chemistry (weight percent) C | Mn | Si | S | P | Zr | Al | Yield strength, p.s.i. | Shelf energy ft.-lbs. in ½ size charpy V-notch specimens | 50% ductile-brittle transfer temp., (°F.) | Minimum bend radius without cracking transverse sample |
|---|---|---|---|---|---|---|---|---|---|---|---|---|
| 957220 | 0.280 | .19 | .39 | .042 | .020 | .007 | — | .030 | 42,600 | Longitudinal, 54<br>Transverse, 17 | Longitudinal, −50<br>Transverse, −10 | .1T |
| 957007 | 0.250 | .14 | .50 | .010 | .019 | .010 | .08 | .035 | 40,500 | Longitudinal, 61<br>Transverse, 38 | Longitudinal, −65<br>Transverse, −60 | .2T |

The improved bending properties of material from Heat No. 957007, containing zirconium as a shape-control agent, is demonstrated by the fact that steels from that heat could be bent about an inside radius of a minimum of .2 inch of their thickness without cracking, whereas steels from Heat No. 957220, which did not contain an inclusion shape-control agent, could only be bent about a minimum inside radius equal to its thickness before cracking. Crack lengths less than 0.10 inch were discounted. The table further shows that the zirconium contributed to improved toughness, particularly in the transverse direction. Equivalent improved formability and toughness is obtained using rare earths or mischmetal rather than zirconium as the inclusion shape-control agent.

We claim:

1. A killed high-strength plain carbon steel which has been hot-rolled finished in the temperature range 1550° F. to 1650° F., cooled at a rate within the range of 20° F. to 135° F. per second, and collected within a preferred temperature range of 1025° F. to 1175° F., the steel being characterized in a hot rolled condition by a yield strength in excess of 35,000 p.s.i., an ultimate tensile strength in excess of 55,000 p.s.i., ductility as measured by percent elongation (2 inches) in excess of 30%, good toughness and formability, said steel consisting essentially of .06% to .20% carbon, .4% to 1.2% manganese, .005% to .3% silicon, sulfur in an amount up to .04%, .04% maximum phosphorus, a sulfide inclusion shape-control agent selected from the group consisting of .05% to .20% zirconium, .01% to .10% of a rare earth and .01% to .10% mischmetal, balance iron, the sulfide inclusions in the steel having a substantially spherical shape.

2. The steel of claim 1 wherein the sulfide inclusion shape-control agent comprises .05% to .20% zirconium.

3. The steel of claim 1 wherein the sulfide inclusion shape-control agent comprises .01% to .10% of rare earths.

4. A killed high-strength plain carbon steel which has been hot-rolled finished in the temperature range 1550° F. to 1650° F., cooled at a rate within the range of 20° F. to 135° F. per second, and collected within a preferred temperature range of 1025° F. to 1175° F., the steel being characterized in a hot rolled condition by a yield strength in excess of 35,000 p.s.i., an ultimate tensile strength in excess of 55,000 p.s.i., ductility as measured by percent elongation (2 inches) in excess of 30%, good toughness and formability, said steel consisting essentially of .12% to [ .15%] *.16%* carbon, .5% to .7% manganese, [.3%] *.1%* maximum silicon, sulfur in an amount up to .02%, .03% maximum phosphorus, a sulfide inclusion shape-control agent selected from the group consisting of .08% to .12% zirconium, .01% to .10% of a rare earth and .01% to .10% mischmetal, balance iron, the sulfide inclusions in the steel having a substantially spherical shape.

5. The steel of claim 4 wherein the sulfide inclusion shape-control agent comprises [.05% to .20%] *.08% to .12%* zirconium.

6. The steel of claim 4 wherein the sulfide inclusion shape-control agent comprises .01% to .10% of rare earths.

* * * * *